US009582498B2

(12) United States Patent
Napieralski et al.

(10) Patent No.: US 9,582,498 B2
(45) Date of Patent: Feb. 28, 2017

(54) ACTIONS ON DIGITAL DOCUMENT ELEMENTS FROM VOICE (71) Applicant: Microsoft Corporation, Redmond, WA (US)

(72) Inventors: Phillip E. Napieralski, Seattle, WA (US); Vishal Gandhi, Bellevue, WA (US); Zhen Huang, Kirkland, WA (US); Denys Krut, Redmond, WA (US); Xiaodi Huang, Seattle, WA (US); Kaili Xu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 14/485,540

(22) Filed: Sep. 12, 2014

(65) Prior Publication Data
US 2016/0078019 A1 Mar. 17, 2016

(51) Int. Cl.
*G10L 15/00* (2013.01)
*G06F 17/27* (2006.01)
(Continued)

(52) U.S. Cl.
CPC ............... *G06F 17/28* (2013.01); *G06F 3/16* (2013.01); *G06F 17/246* (2013.01); *G10L 15/22* (2013.01)

(58) Field of Classification Search
CPC ......... G10L 15/00; G10L 15/22; G10L 15/26; G10L 15/265; G06F 3/16; G16F 17/20
(Continued)

(56) References Cited

U.S. PATENT DOCUMENTS 5,995,918 A 11/1999 Kendall et al.
6,347,299 B1* 2/2002 Holzman ................. G06F 3/16
704/270
(Continued)

FOREIGN PATENT DOCUMENTS

EP 1566954 A2 8/2005
WO 0019410 A1 4/2000

OTHER PUBLICATIONS

"International Search Report & Written Opinion Issued in PCT Patent Application No. PCT/US2015/049053", Mailed Date: Dec. 17, 2015, 12 Pages.
(Continued)

*Primary Examiner* — Paras D Shah
(74) *Attorney, Agent, or Firm* — Dave Ream; Tom Wong; Micky Minhas (57) ABSTRACT A set of one or more terms can be derived from the voiced user input. It can be determined that the set of one or more terms corresponds to a specific digital document in a computer system, and that the set of one or more terms corresponds to at least one computer-executable command. The determination that the set of one or more terms corresponds to the at least one command can include analyzing the set of one or more terms using a document-specific natural language translation data structure. The translation data structure can be a computer-readable data structure that is identified in the computer system with the specific digital document in the computer system. It can be determined that the set of one or more terms corresponds to an element in the document, and the at least one command can be executed on the element in the document.

20 Claims, 6 Drawing Sheets (51) Int. Cl.
*G06F 17/28* (2006.01)
*G06F 3/16* (2006.01)
*G10L 15/22* (2006.01)
*G06F 17/24* (2006.01)

(58) Field of Classification Search
USPC ......... 704/231, 235, 275, 270; 715/727, 728
See application file for complete search history.

(56) References Cited

U.S. PATENT DOCUMENTS

| | | | |
|---|---|---|---|
| 6,965,864 B1 | 11/2005 | Thrift et al. | |
| 7,319,961 B2 | 1/2008 | Al-Dhubaib et al. | |
| 7,406,657 B1* | 7/2008 | Callaghan | G06Q 10/10 |
| | | | 715/203 |
| 7,747,442 B2 | 6/2010 | Doyle | |
| 7,996,223 B2 | 8/2011 | Frankel et al. | |
| 8,209,183 B1* | 6/2012 | Patel | G06K 9/72 |
| | | | 382/181 |
| 8,224,654 B1* | 7/2012 | LeBeau | G10L 15/22 |
| | | | 704/231 |
| 8,255,218 B1* | 8/2012 | Cohen | G06F 3/167 |
| | | | 704/248 |
| 8,977,965 B1* | 3/2015 | Ehlen | G06F 3/00 |
| | | | 715/719 |
| 2002/0065654 A1 | 5/2002 | Grant | G10L 15/193 |
| | | | 704/235 |
| 2003/0158736 A1* | 8/2003 | James | G06F 3/167 |
| | | | 704/270.1 |
| 2005/0071172 A1* | 3/2005 | James | G06F 3/167 |
| | | | 704/275 |
| 2005/0086057 A1 | 4/2005 | Kosaka et al. | |
| 2006/0010228 A1* | 1/2006 | Bodin | G06F 17/30056 |
| | | | 709/219 |
| 2006/0064302 A1* | 3/2006 | Ativanichayaphong | |
| | | | G06F 17/243 |
| | | | 704/235 |
| 2006/0136220 A1* | 6/2006 | Gurram | G10L 15/005 |
| | | | 704/275 |
| 2006/0206336 A1* | 9/2006 | Gurram | G06F 3/167 |
| | | | 704/275 |
| 2008/0077406 A1* | 3/2008 | Ganong, III | G10L 15/22 |
| | | | 704/251 |
| 2008/0229206 A1* | 9/2008 | Seymour | G06F 3/0481 |
| | | | 715/727 |
| 2009/0254347 A1* | 10/2009 | Moore | G06F 17/243 |
| | | | 704/260 |
| 2012/0215543 A1* | 8/2012 | Oz | G06F 3/167 |
| | | | 704/275 |
| 2012/0323574 A1* | 12/2012 | Wang | G10L 15/22 |
| | | | 704/246 |
| 2014/0096004 A1* | 4/2014 | Zhou | G06F 3/167 |
| | | | 715/728 |
| 2014/0258856 A1* | 9/2014 | Mauro | G06F 3/0481 |
| | | | 715/708 |

OTHER PUBLICATIONS

Wilbur, L. Tracy, "Voice Recognition Software Tutorial—Working with Microsoft Office", Published on: May 2, 2004, Retrieved from: <<http://www.usca.edu/wilbur/edet735/office.htm>>, 3 Pages.

Agarwal, Ashish, "Text to Speech in Excel—Progressive Excel Tutorial", Published on: Mar. 9, 2014, Retrieved From<<http://www.chatanki.com/tips-tricks/text-to-speech-in-excel/>>, 5 Pages.

"Introducing Computer Speech Technology", Published on; Jun. 27, 2009 Available at: http://msdn.microsoft.com/en-us/library/ms870025.aspx.

"MSDN Voice Search for Windows Phone 8.1", Retrieved Date: Jul. 14, 2014 Available at: http://code.msdn.microsoft.com/wpapps/MSDN-Voice-Search-for-95c16d92/sourcecode?fileId=112757&pathId=1889186648.

"Written Opinion Issued in PCT Patent Application No. PCT/US2015/049053", Mailed Date: Jul. 29, 2016, 4 Pages.

"International Preliminary Report on Patentability in PCT Patent Application No. PCT/US2015/049053", Mailed Date: Dec. 1, 2016, 7 Pages.

* cited by examiner

ACTIONS ON DIGITAL DOCUMENT ELEMENTS FROM VOICE

BACKGROUND

When interacting with digital documents stored in computer systems, a user typically provides input, such as in the form of a touch gesture on a screen or a mouse click, to open the document. The user then navigates the document to find one or more displayed elements in the displayed document. With an element displayed, the user may provide additional input to enter a value in the element. For example, the value may be a string of alphabetic characters, numerical characters, symbols, etc. Similarly, if a user is to read information from a document, the user can find the pertinent element in the displayed document and read the information. In addition to such interactions with input by hand motions and reading by sight, some computer systems allow text to be entered by voice input (speech to text) and to be read back by audible voice feedback (text-to-speech).

SUMMARY

In one aspect, natural language voiced user input can be received into a computer system. A set of one or more terms can be derived from the voiced user input. Also, it can be determined that the set of one or more terms corresponds to a specific digital document in the computer system, and that the set of one or more terms corresponds to at least one computer-executable command. The determination that the set of one or more terms corresponds to the at least one command can include analyzing the set of one or more terms using a document-specific natural language translation data structure. The translation data structure can be a computer-readable data structure that is identified in the computer system with a specific digital document in the computer system. It can be determined that the set of one or more terms corresponds to an element in the document, and the at least one command can be executed on the element in the document.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Aspects described herein are directed to techniques and tools for improved interaction with digital documents utilizing natural language voice input. Such improvements may result from the use of various techniques and tools separately or in combination. As used herein, natural language refers to human spoken languages by which humans ordinarily communicate with each other by speaking and hearing. This term natural language is in contrast to computer languages, such as source code languages, object code languages, computer script languages, etc., although there may be some overlap between natural language and computer language. Also, as used herein, a grammar refers to a computer-readable data structure (which may be a continuous data structure, a distributed data structure, etc.) that defines one or more grammatical natural language forms for voice-entered terms. The grammar can be used to map forms of natural language voice-entered terms to computer objects and/or actions. For example, a set of voice-entered terms whose form is defined in a grammar may be mapped to a document, to an element in a document, to an action to be taken on an element in a document, and/or to a value to be entered into a document.

The techniques and tools discussed herein may include taking an action on a digital document stored in a computer system in response to voiced user input. For example, in response to voiced natural language user input, a spreadsheet document (which could be stored locally or remotely from a location where the user providing the voiced input is located) may be modified. For example, a value specified in the natural language voiced input may be entered into a cell of the spreadsheet. As another example, natural language voiced input may be provided, and the computer system may respond to the voiced input by audibly reading a value from a cell of the spreadsheet. The technique may also be useable with other types of digital documents, such as word processing documents, slide presentation documents, Web pages, etc.

More specifically, the tools and techniques may include responding to natural language voiced input by accessing a document-specific voice grammar or other document-specific natural language translation data structure at runtime. For example, such a translation data structure may be stored in metadata for the corresponding document, or the translation data structure may be stored in one or more other locations. The translation data structure may be used to identify a computer-executable command that corresponds to the voiced input. An element (out of a plurality of elements in the document, such as a displayable element out of a plurality of displayable elements in the document) of the document that corresponds to one or more terms from the voiced input can also be determined. For example, the element may be identified by an object that is associated with the translation data structure, which is in turn associated with one or more terms in the voiced input, and the determination may be made by examining the object. A computer system can execute the command on the element in the document (such as a command to enter a value into the element and/or read and return information from the element). When a value is entered into the element of the document, that value may be a value that is stated in the voiced input. Accordingly, the tools and techniques discussed herein can allow a user to utilize natural language to "talk to" a document, to enter information into the document and/or retrieve data back from the document. The data retrieved from the document can be audibly read back to the user with a text-to-speech service. Also, the entering of the information into the document and/or retrieving and reading back data from the document can be done in an automated manner in response to the voiced user input.

Accordingly, one or more benefits can be realized from the tools and techniques described herein. For example, voice interaction features discussed herein, such as the input of data into a document and/or reading data from a document using natural language voiced user input, can improve the usability of a computer system implementing such features. For example, a user may use natural language to which the user is accustomed, which in some scenarios may be done without the user needing to view a computer display or provide tactile input in the form of touch gestures, keystrokes, etc. Thus, as an example, the technological advancements discussed herein may allow a user to enter information into a document while performing other activities that require use of the user's vision and/or hands, such as walking or possibly driving (though attention, of course, is to be paid to local laws, general safety considerations, and courtesy when considering whether to use the features during particular activities). As another example, the document voice interaction features discussed herein could improve the experience of a user with disabilities that is working with a digital document, allowing that user to interact with voice, and allowing the user to avoid using one or more impaired physical features of the user (e.g., where the user has impairment with regard to reading ability, finger dexterity, eyesight, etc.).

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
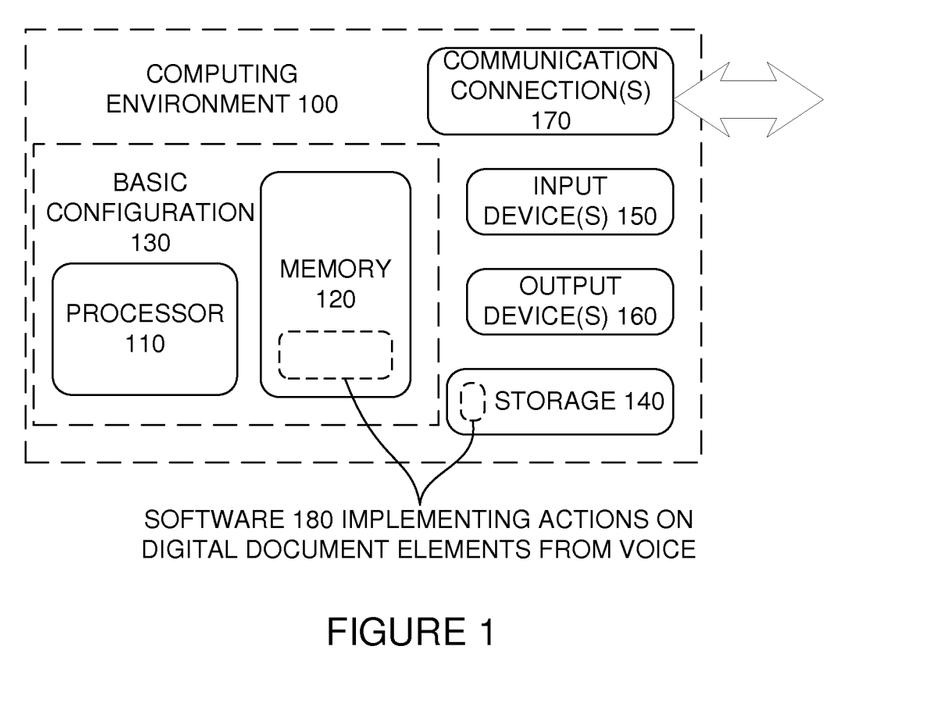
FIG. 1 is a block diagram of a suitable computing environment in which one or more of the described aspects may be implemented.

FIG. 1 illustrates a generalized example of a suitable computing environment (100) in which one or more of the described aspects may be implemented. For example, one or more such computing environments can be used as a language translation computing component and/or voice interaction computing component. Similarly, one or more such computing environments can be used as a client, and one or more such computing environments can be used as a server. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing actions on digital document elements from voice. An implementation of actions on digital document elements from voice may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
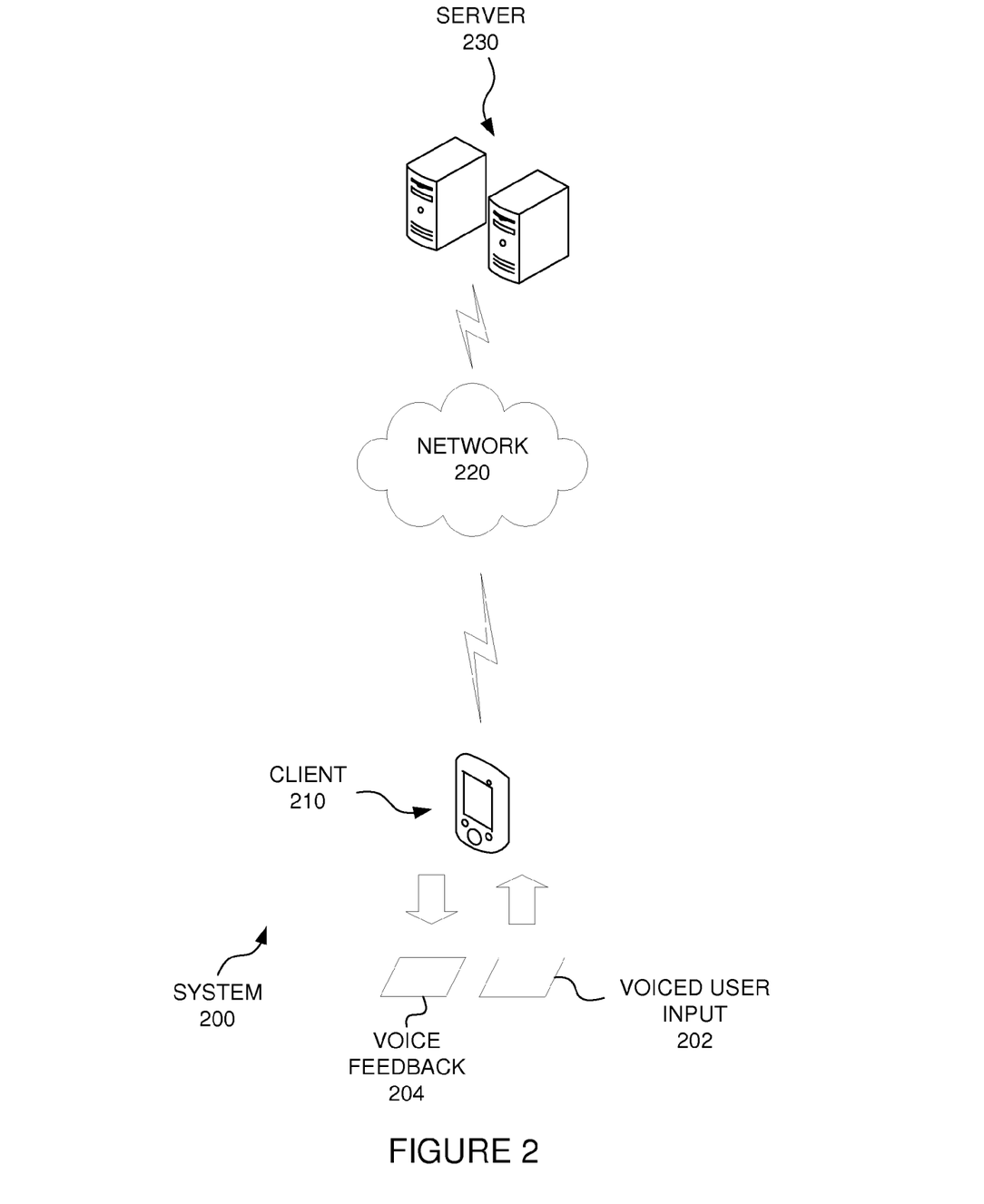
FIG. 2 is schematic diagram of a system for performing actions on digital document elements from voice input.

II. System for Performing Actions on Digital Document Elements from Natural Language Voice Input A. General Client-Server System FIG. 2 is a schematic diagram of a system (200) for performing actions on digital document elements from voice input. The system (200) can receive voiced user input (202), respond to the voiced user input (202) by performing an action on a determined element of a document, and the system (200) may also respond to the voiced user input (202) by providing audible voice feedback (204). The system can include a client (210), which can be a computing device, such a mobile computing device (smartphone, tablet, etc.). The client (210) can be connected to a computer network (220), which can in turn connect the client (210) to a server (230). The server (230) may include one or more computing machines that may be dedicated and/or multi-purpose server machines. The functions to be performed in performing actions on digital document elements from voice input may be performed on the server (230), on the client (210), or divided between the client and server. For example, the client (210) may perform all such functions without involving a server (230). As another example, the client (210) could pass the voiced user input (202) to the server (230), such as in a coded audio format, and the server (230) could determine actions to be performed and perform those actions on a document stored on the server (230) without further involving the client (210), except to possibly pass back coded audio for the voice feedback (204) to the client (210). The tools and techniques of performing actions on digital document elements from voice input discussed herein could be split between the client (210) and the server (230) in various other ways, which could involve communications (e.g., network messages, application programming interface calls, etc.) between the client (210) and the server (230) over the network (220). Accordingly, the functions of the computer components, data structures, etc. discussed below with reference to FIG. 3 can be distributed in any of various ways between multiple computing machines, such as between the client (210) and server (230), each of which may be hosted on one or more computing machines.

B. Computer System Computing Components

Figure 3:
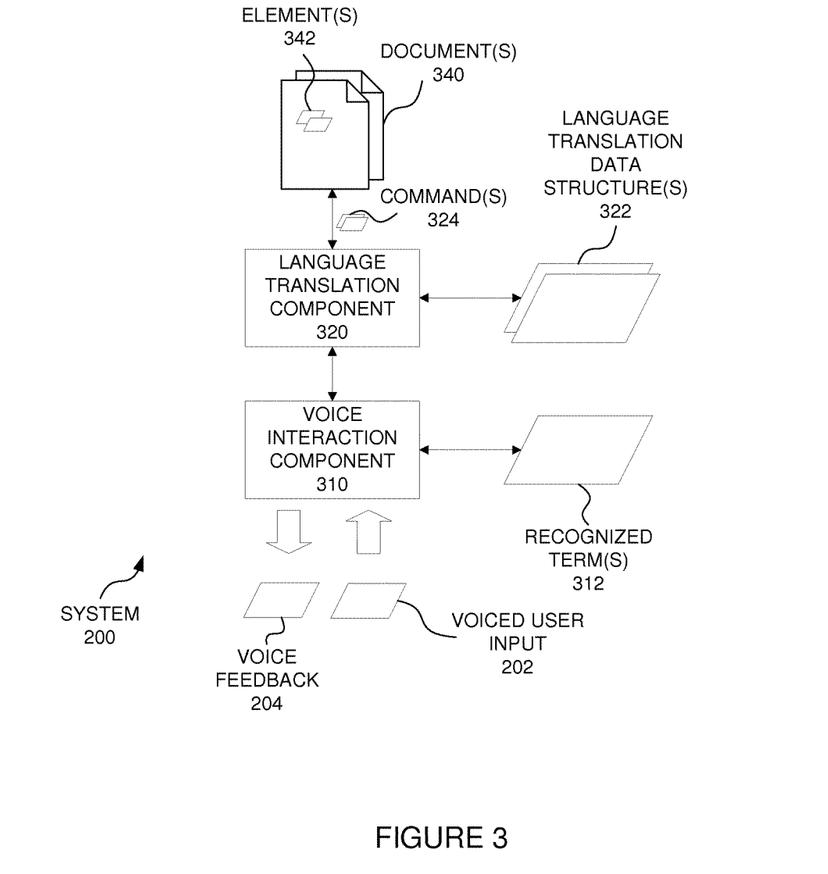
FIG. 3 is another schematic diagram of the system of FIG. 2.

Referring now to FIG. 3, various components of the computer system (200) will be discussed. A voice interaction component (310) can receive voiced user input (202) and can respond with voice feedback (204), which can be read back to a user in an audible manner. The voiced user input (202) can be in the form of natural language voiced user input from a user. The voice interaction component (310) may be a voice interaction component such as existing voice interaction components that receive voiced natural language instructions from a user, decipher meanings from those voiced natural language instructions, and take appropriate actions in response to the deciphered meanings. Accordingly, the voice interaction component (310) can be loaded in memory and launched to become active and perform speech-to-text analysis on the voiced user input, producing a set of one or more recognized terms (312). Those recognized terms (312) can be used to derive computer-executable commands. For example, an entry may be registered with the voice interaction component (310), which can dictate that when a set of natural language instructions begins with a particular term, such as "Document Manager", then the voice interaction component (310) is to launch a language translation component (320) (such as by loading the language translation component (320) and passing control to the language translation component (320)), and is to pass the recognized terms (312) of the natural language instructions from the voiced user input (202) to the language translation component (320).

The particular term, such as "Document Manager", could be omitted by directly launching the language translation component (320) through non-voice user interaction, such as touch or a mouse click. This would then allow the user to "speak to" their documents as discussed herein, without speaking a particular term for the language translation component (320) (such as the term "Document Manager" at the beginning of the spoken natural language sentence).

The language translation component (320) can access language translation data structures (322) for translating the recognized terms (312) from the voiced user input (202) into commands (324) to be executed on corresponding documents (340). For example, the language translation component (320) may have access to multiple language translation data structures (322), with each such data structure corresponding to a document (340) of the multiple documents (340). Each language translation data structure (322) may be located on a continuous portion of computer memory, or each language translation data structure may be dispersed, with parts of the data structure being interleaved with parts of other data structures, for example. Also, each language translation data structure (322) may be stored in metadata for the corresponding document (340), stored within the document (340) itself (within cells of a spreadsheet document, etc.), and/or stored elsewhere. In any of these scenarios, the system (200) can correlate each language translation data structure (322) with the corresponding specific document (340) to which that language translation data structure (322) pertains. For example, the system (200) may maintain a database that links the translation data structure (322) to the document (340), the translation data structure (322) may reference the document (340), or the translation data structure (322) may be located within metadata for the document (340). Thus, different language translation data structures (322) can be used to derive commands to be executed on different documents (340).

As discussed above, the language translation component uses the pertinent language translation data structure (322) to derive the commands (324) from the recognized terms (312), which can be derived from the voiced user input (202) by the voice interaction component (310). The commands (324) can be formatted to perform actions on particular elements (342) of the documents (340), which elements may be indicated in the voiced user input (202), as will be discussed more below.

The language translation data structure(s) (322) may be in any of various forms. For example, each language translation data structure (322) may include one or more voice grammars. Each such voice grammar can include one or more templates to which the recognized terms (312) can be matched. Thus, in such a scenario, the voice grammar and the recognized terms can be loaded into computer memory and compared, such as being compared with regard to the terms themselves and the order of the terms. If the recognized terms (312) match the voice grammar, then a command (324) that is correlated with the voice grammar in the language translation data structure (322) can be performed. The language translation data structure (322) may be in any of various formats, such as an XML object, or some other format.

As another example, the language translation data structure (322) may be a different type of data structure. For example, the language translation data structure (322) may include a neural network, or some other data structure that can be used to map a set of recognized terms (312) onto one or more commands to be performed. For example, such a neural network may consider historic results, and the neural network may be modified according to such historic results to provide machine learning. For example, such results could include feedback from users on whether intended commands were selected when those users' voiced user input (202) was analyzed to translate them into commands (324).

The commands (324) themselves may be in any of various forms, such as application programming interface calls, function calls, network messages, etc.

As an example, performing a command (324) may include the language translation component (320) directly performing an action on an identified element (342) of the document (340) that corresponds to the language translation data structure (e.g., inserting a value into the element and/or reading a value from the element). Alternatively, executing a command (324) may be performed by the language translation component (320) communicating the command to another computing component such as via an application programming interface call, via a network message, etc. The command (324) can then be actually carried out by one or more other computing components that receive all or part of the command from the language translation component (320). For example, in the case of a spreadsheet, the language translation component (320) may send a command (324) to a spreadsheet application, or to a document management application. Also, executing a command may involve performing actions on multiple elements (342) of a document. For example, a command (324) may dictate that specified values are to be entered in multiple identified elements (342) of a document (340). As another example, a command (324) may dictate that a specified value is to be entered into one element (342) of a document, and then another related value is to be read from a different element (342) of a document. For example, the value that is read may be a value that depends at least in part on the value that was entered. The value that is read may then be passed to the voice interaction component (310) to be audibly read (using text-to-speech) back to the user as the voice feedback (204). Another example of voice feedback (204) may be an audible confirmation that a desired value was successfully entered into an element (342) of the specified document (340).

The voice interaction component (310) and/or the language translation component (320) may provide interfaces to allow users to input, create, and edit the language translation data structures (322) and commands (324). Accordingly, users could provide user input specifying, for example, grammars that are to be matched to act on a specified document. The user input could also specify the commands to be performed, and the locations of elements in the document (340) upon which the commands will be executed. Additionally, user input may be provided to link a particular language translation data structure (322) to a particular document (340), to one or more commands (324), and possibly to one or more voice inputs that will be recognized as referring to that corresponding document (340) and language translation data structure (322). The user input may also provide the language translation component with the location of the language translation data structure (322) and the location of the document (340). Such user input may also be provided to modify the language translation data structure (322), as well as associated units of data (e.g., data units that link the language translation data structure (322) to a corresponding document (340), etc.).

As illustrated, the language translation component (320) can interact with multiple different documents (340), and with multiple different language translation data structures (322) corresponding to those documents (340). Thus, the system can receive a first set of voiced user input (202) referencing a first document (340), and can respond by performing a specified action on an element (342) of that document (340) using the corresponding language translation data structure (322). The language translation component (320) may then receive a second set of voiced user input (202) referencing a second document (340), and can respond by performing a specified action on an element of that document (340) using the corresponding language translation data structure (322). In some aspects, each language translation data structure (322) may correspond to one and only one document (340), but in other aspects, one or more language translation data structures may correspond to a specified set of multiple documents (340), such as where those documents (340) share similarities that allow for use of the same language translation data structure (322). In either aspect, the computer system (200) can correlate a language translation data structure (322) with a specific document (340) to be used in acting upon elements in that document (340).

In one implementation, the voice interaction component (310) and the language translation component (320) may be separate computer software applications that are able to communicate with each other through application programming interfaces. However, the language translation component (320) and the voice interaction component (310) could be included in a single application. Also, one or both of the voice interaction component (310) and the language translation component (320) may be distributed between multiple machines. For example one or both of these components (310 and/or 320) may include sub-components that are each located on a different computing machine. For example, each of the components (310 and 320) may include client and server sub-components. The server sub-components could be located on a single server machine or spread across multiple server machines.

C. Example of Implementing Actions on Digital Document Elements from Voice

In one example, the document (340) may be a spreadsheet that is stored and managed using a document management Web service running on a server (230) that is located remotely from a client device (210), such as a laptop or desktop computer, a tablet computer device, or a smartphone device. While this specific scenario is discussed here, as discussed above, the tools and technique discussed herein could be utilized with other document structures or online services that return a language translation data structure such as a voice grammar, and an identification of an element to modify a document (e.g., using an indication of the location of the element in the document).

In the example, the user says an application name for the language translation component (320) at the beginning of a sentence that is provided in voiced user input (202) to the voice interaction component (310). The voice interaction component (310) can respond by launching the language translation component (320) (e.g., through application programming interface call(s)). Upon launching the language translation component, the language translation component (320) can receive the recognized terms (312) from the voice interaction component (310). The language translation component (320) can parse from the recognized terms a term that is identified with the document (340) (such as one or more words that have been registered with the language translation component in connection with the document (340), e.g., a short name for the document). In response to identifying the term for the document (340), the language translation component (320) can load the language translation data structure (322) for that particular document (340) into computer memory.

The references to the document can be recognized by the language translation component (320), such as by recognizing phrases such as "to my <document>," at the end of the statement formed by the recognized terms (312) (where <document> indicates a name of the document). In an example, the document name can be mapped to an indication of a location for the document (e.g., a uniform resource locator), such as by using a database that is accessible to the language translation component (320), such as by being locally stored on the client (210) where the language translation component (320) is running at least in part on the client (210). For example, mappings of document names to locations can be entered by user input, but could be populated automatically such as by searching locally on the client (210), and/or on an online service that stores documents on the server (230). For example, a Web services application programming interface can be used by a client side sub-component of the language translation component (320) to retrieve the language translation data structure (322) (e.g., a voice grammar) for a document (340) stored remotely on the server (230). For example, the language translation data structure (322) may be stored in the metadata of the document, in an online database, or perhaps in a set spot in the document/spreadsheet. The language translation component (320) can retrieve the language translation data structure, and can read and load the language translation data structure (322) into computer memory. In addition to a grammar or other structure for translating recognized terms (312) into commands (324), the language translation data structure may include an indication of a location (such as a website URL or spreadsheet cell, such as cell A2), to determine the identity and location of the element that will be acted upon by the command (324) corresponding to the language translation data structure. In one example, a value in a reference element of the document (340) itself (e.g., a cell in a spreadsheet document) may indicate a location of another different element (342) that is to be acted upon.

In the example of a voice grammar, the voice grammar can be loaded and processed by voice library application programming interfaces. Those voice library application programming interfaces can return a list of variables, whose size can be determined by the grammar itself. For a first variable, the value for the variable can be placed in the element (342) of the document (340) (e.g., a loaded cell number (such as A2) for a spreadsheet). Additionally, in some scenarios consecutive variables can be placed immediately following the location of the first element. In the case of a spreadsheet, these variables could be automatically loaded into adjacent cells (such as cells A3, A4 and so on).

For instance, if the name of the language translation component is "Document Manager", the voiced user input may say, "Document Manager, add 40 dollars for gas and 20 to miles to my gas mileage tracker spreadsheet." The friendly document name can be recognized as "gas mileage tracker spreadsheet," which the user may have already defined in the application for the language translation component (320). The voice interaction component can recognize the term "Document Manager" as corresponding to the language translation component (320), and can respond by deriving the recognized terms (312) from the voiced user input (202), launching the "Document Manager" language translation component (320), and passing the recognized terms (312) to the language translation component (320).

The language translation component (320) can then find the appropriate uniform resource locator for the document (340) mapped to the friendly document name and load the voice grammar from metadata for the document (340) (or some other location such as inside the document, depending on the implementation). The voice grammar can indicate that there is to be something similar to the form "add <a number> <for or to> gas [and, optional] <a number> <for or to> miles", where the words "a number" and "for or to" describe required terms (a number, and either the word "for" or the word "to", while "and, optional" describes the optional term "and". The voice grammar can also indicate the order of the terms is to be in the same order as provided in the grammar. Locations to insert the numbers can also be read from the document (e.g., cell A1 in a spreadsheet may indicated that the value A2, so that the numbers for gas and miles are to be entered in cells A2 and the adjacent cell B2, respectively).

In the example, the recognized terms (312) can be parsed and compared to the voice grammar, which can allow the language translation component (320) to recognize that the number for gas and the number for miles are to be placed in cells A2 and B2, respectively. In addition to entering the numbers in the cells, the language translation component (320) can move the location to the next row (in the case of a spreadsheet) or can move the location in some other fashion defined by the document type. For example, in the example above, the reference to "A2" that is in the cell A1 can be replaced by the reference "A3", indicating that the next entries will be entered into cells A3 and B3. Rather than having such location indicators in the document, the location indicators could be located elsewhere. As another example, the locations of the elements could be determined by searching, such as by searching for the first empty cell in column A of a spreadsheet, and entering the value in that cell.

While this example has been given, the tools and techniques discussed herein could be used in many other scenarios. Some other examples of spreadsheet documents for which the tools and techniques could be useful include food tracker spreadsheets, budget spreadsheets, project planning spreadsheets, and so on. This technique could also be used for other documents such as word processing documents or Web pages. For instance, if a user wanted to quickly add an entry to a bibliography in a research paper that is in a word processing document, the user might say, "Document Manager, Add 'Abraham Lincoln' to the bibliography of my PhD thesis." In such a scenario, locating and inserting a value in the word processing document may involve using a macro, which could readily be written to search for the "bibliography" section of the document, and then to enter a hard return at the end of that section and insert the specified text into the resulting new line after the hard return. Similar searching techniques could be used to enter information into and retrieve information from Web pages.

Additionally, similar techniques can be used to retrieve information from one or more elements of a document and read that information back to a user. For example, for a budget spreadsheet, a user may say, "Document Manager, add ten dollars to my budget for gas." In response, the computer system can add ten dollars to a specified spreadsheet cell in a budget spreadsheet in a location for adding entries for gasoline.

Additionally, after the value is successfully entered into the cell, the language translation component (320) can instruct the voice interaction component (310) to respond with an audible confirmation, such as "Your budget is updated." The language translation component (320) may also respond with other information from the spreadsheet. For example, the budget spreadsheet may have a cell that is automatically updated using formulas to show the percentage of the budget that has been spent. In this case, that cell can be identified as a location for retrieving information for a response in the form of "<value from cell in spreadsheet> percent of your budget is spent", where "value from cell in spreadsheet" is the value in the cell for the percentage of budget that has been spent. The language translation component (320) can compose the resulting statement (such as "42% of your budget is spent"), and send the statement to the voice interaction component (310) to be read back to the user as voice feedback (204).

Similarly, the voiced user input (202) may request other actions, such as retrieving information from an element (342) in the document (340), rather than (or in addition to) requesting that information be entered into an element (342) in the document (340). For example, a user may say, "Document Manager, how much of my budget is spent?" In response, the voice interaction component (310) can recognize the term "Document Manager", and can launch the language translation component (320) and pass the recognized terms (312) to the language translation component (320). The language translation component (320) can recognize the document name "budget" and can retrieve the corresponding language translation data structure (322) for the budget document. The language translation component (320) can use the language translation data structure to determine that the user is asking for information to be read back from a specified element (the element where it specifies the amount of budget that has been spent) in the budget document. For example, as noted above, this can be done using a grammar, a neural network, or similar structure in the language translation data structure, as well as an indication of a location and a command associated with that grammar or other recognized structure. Upon locating the element (342) in the document (340), the language translation component can read the value (such as 42 for the budget percentage), can compose a statement (such as "42% of your budget is spent"), and can pass that statement to the voice interaction component (310) to be read audibly to a user.

III. Techniques for Performing Actions on Digital Document Elements from Natural Language Voice Input Several techniques for performing actions on digital document elements from natural language voice input will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 4:
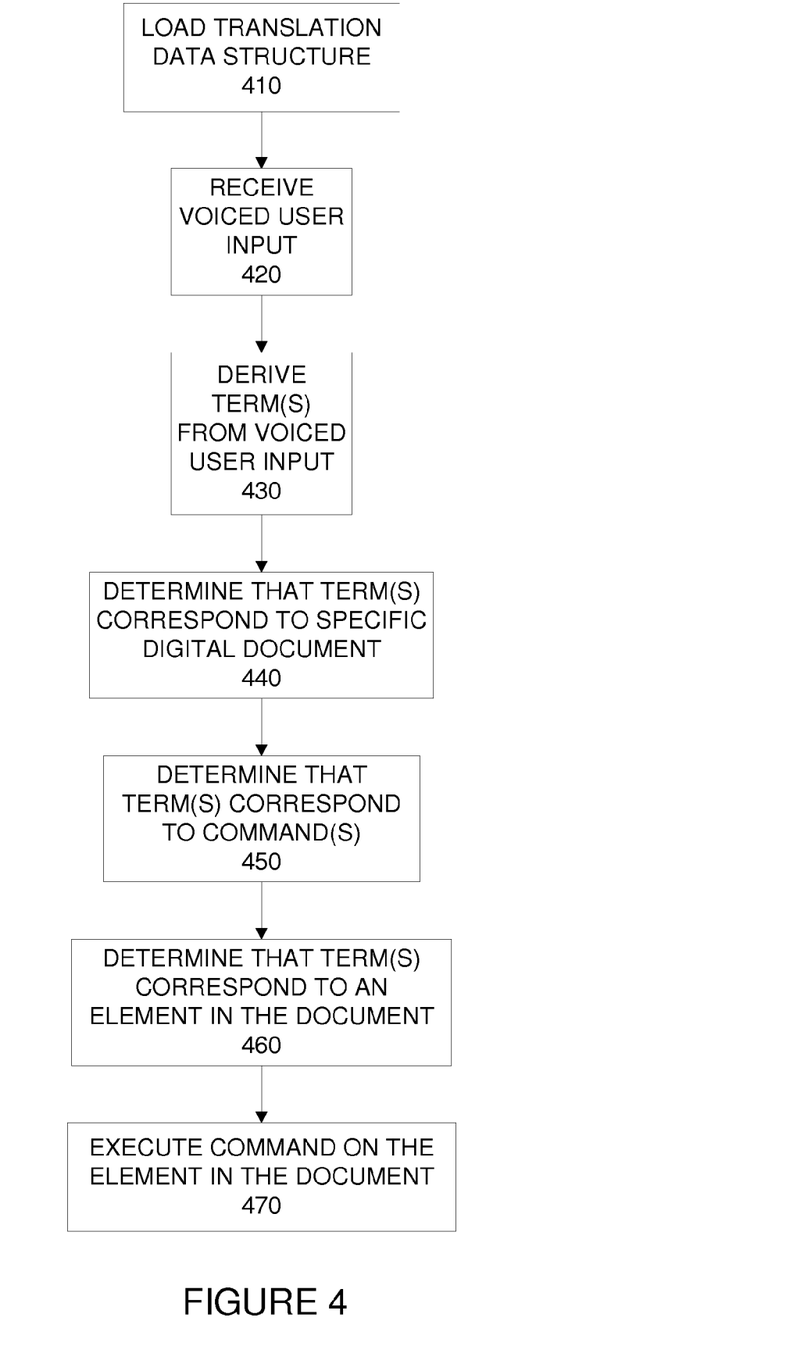
FIG. 4 is a flowchart of a technique for performing actions on digital document elements from natural language voice input.

Referring to FIG. 4, a technique for performing actions on digital document elements from natural language voice input will be described. The technique can include loading (410) a document-specific natural language translation data structure into a computer memory in a computer system. The translation data structure can be a computer-readable data structure that is identified in the computer system with a specific digital document in the computer system. The technique can further include receiving (420) natural language voiced user input into the computer system. A set of one or more terms can be derived (430), via the computer system, from the voiced user input. Also via the computer system, it can be determined (440) that the set of one or more terms corresponds to the specific digital document in the computer system. Moreover, it can be determined (450), via the computer system, that the set of one or more terms corresponds to at least one computer-executable command. The determination (450) can include analyzing the set of one or more terms using the document-specific natural language translation data structure. Also, it can be determined (460), via the computer system, that the set of one or more terms corresponds to an element in the document, such as where one or more of the terms matches a grammar that is identified with a document location for such an element. Moreover, the at least one command can be executed (470) on the element in the document. Upon receiving (420) the voiced user input, the computer system may perform one or more of the remainder of the acts (430, 440, 450, 460, and 470) automatically in response to receiving (420) the voiced user input. This technique and those that are described below can improve the efficiency and usability of a computing system by providing for voice interaction with digital documents, such as by allowing voice interaction to be used to prompt the computer system to execute command(s) on an element—and possibly on multiple elements—in the document.

The translation data structure may include a voice grammar, with the voice grammar being a template that defines one or more grammatical forms for voice-entered natural language terms. For example, the voice grammar may include code, such as XML code, which can define the grammatical form(s) for voice-entered natural language terms, and that XML code may also define one or more commands to be executed (470) on the element in the document.

Also, determining (450) that the set of one or more terms corresponds to the at least one command can include determining that the set of one or more terms fits at least one of the grammatical form(s) defined by the grammar. Additionally, determining (460) that the set of one or more terms corresponds to the element in the document can include identifying a location in the document, such as by accessing a data unit that indicates the location of the element and/or searching the document for the location of the element and/or for a location of a section of the document that includes the element. The technique can further include playing an audible reading of a read-back value derived from the value entered into the element in the document, such as by using a voice-to-text computing component to convert the value into voiced audio data, and playing that audio data with speakers that are included in the computer system. The read-back value can be the same as or different from the value entered into the element in the document. For example, the element in the document may be a first element, the read-back value may be a value in a second element of the document that is different from the first element of the document, and playing the audible reading of the read-back value can include reading the read-back value from the second element in the document.

The technique of FIG. 4 can further include deriving a value (a number, word, a set of words, etc.) from the set of one or more terms, and executing (470) the command on the element in the document can include entering the value into the element in the document. For example, the set of one or more terms may include the value, or the value may be a value that is not in the set of one or more terms, but is calculated from the set of one or more terms.

In the technique of FIG. 4, executing (470) the at least one command on the element in the document can include reading a value from the element in the document and returning the value in the first element of the document. The technique may further include playing an audible reading of the value in response to receiving the natural language voiced user input into the computer system. For example, this may be done using text-to-speech technology and playing the resulting audio data through speakers in the computer system, as discussed above.

The technique of FIG. 4 may further include receiving user input correlating the translation data structure with the digital document in the computer system. User input may also be provided to define the translation data structure, and also to modify the translation data structure.

The technique of FIG. 4 may be used with a plurality of documents using a plurality of respective translation data structures. This can allow voiced interaction to be personalized to different documents, with a resulting increase in usability of the computer system. For example, the computer system can store a plurality of translation data structures, with each being identified with a different document of a plurality of documents stored in the computer system. The translation data structure can be termed a first translation data structure, the document can be termed a first document, the natural language voiced user input can be termed a first set of natural language voiced user input, and the set of one or more terms can be termed a first set of one or more terms. The at least one command can be a first command set including one or more commands. The technique can include loading a second document-specific natural language translation data structure into the computer memory in the computer system, with the second translation data structure being a computer-readable data structure that is identified in the computer system with a second specific digital document in the computer system. The technique can further include receiving a second set of natural language voiced user input into the computer system and deriving, via the computer system, a second set of one or more terms from the second set of voiced user input. Moreover, the technique can include determining, via the computer system, that the second set of one or more terms corresponds to the second specific digital document in the computer system, as well as determining, via the computer system, that the second set of one or more terms corresponds to a second command set including at least one computer-executable command. The determination that the second set of one or more terms corresponds to the second command set can include analyzing the second set of one or more terms using the second document-specific natural language translation data structure. It can be determined, via the computer system, that the second set of one or more terms corresponds to an element in the second document. The at least one command can be executed on the element in the second document. The first translation data structure can be different from the second translation data structure, the first document can be different from the second document, and the element in the first document can be different from the element in the second document.

Figure 5:
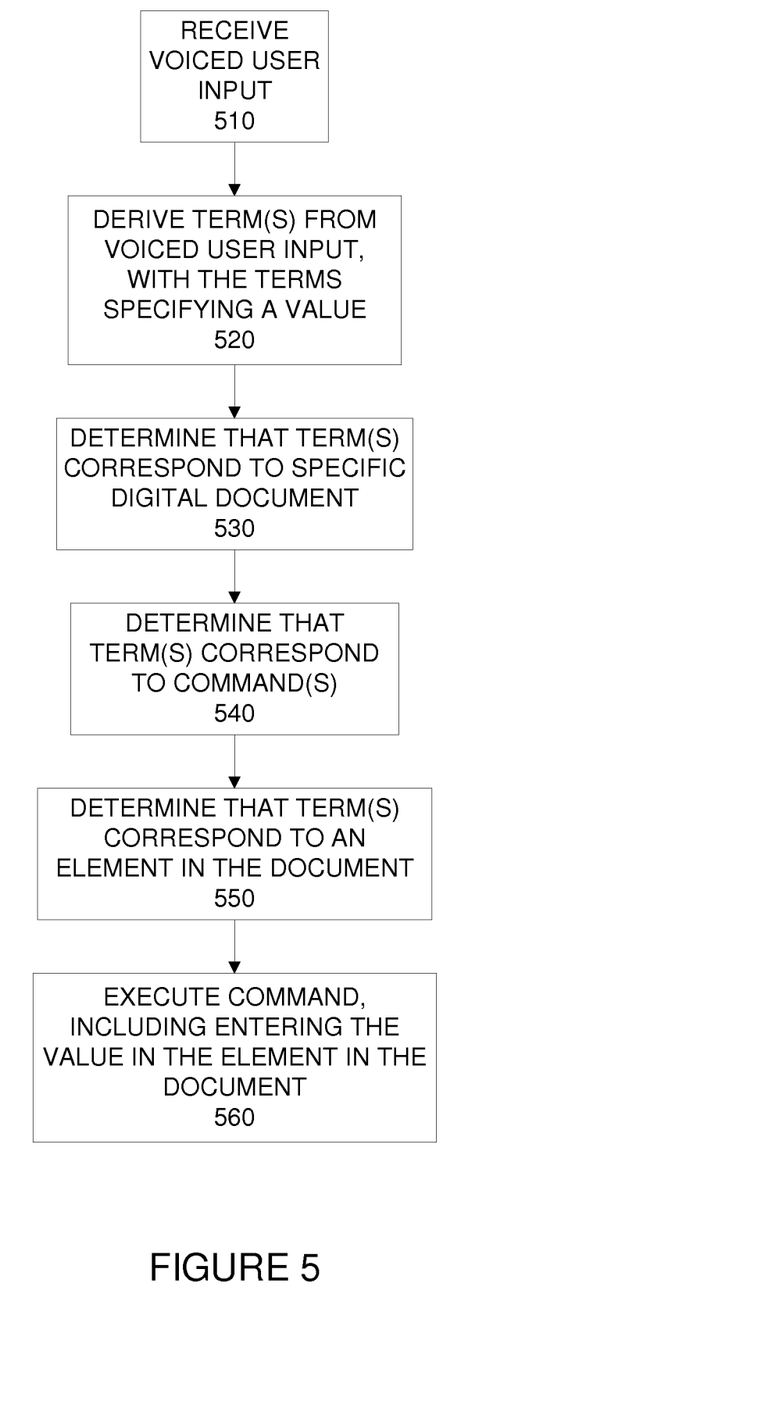
FIG. 5 is a flowchart of another technique for performing actions on digital document elements from natural language voice input.

Referring to FIG. 5, another technique for performing actions on digital document elements from natural language voice input will be described. The technique can include receiving (510) natural language voiced user input into the computer system. The technique can also include deriving (520) a set of one or more terms from the voiced user input, with the one or more terms specifying a value to be inserted. The technique can further include determining (530) that the set of one or more terms corresponds to the digital document in the computer system. Additionally, the technique can include determining (540) that the set of one or more terms corresponds to at least one computer-executable command. The determination (540) that the set of one or more terms corresponds to the at least one command can include analyzing the at least a portion of the set of one or more terms using a document-specific natural language translation data structure. It can also be determined (550) that the set of one or more terms corresponds to an element in the document. Additionally, the at least one command can be executed (560) on the element in the document, which execution (560) can include entering the value into the element.

The document of one or both of the techniques above may be a document such as a spreadsheet document, a word processing document, a slide presentation document, or a Web page. In one specific example, the element can be a cell in a spreadsheet. In any of these, the document can be a digital document that is displayable to display the contents of the document, including the contents of the element(s) in the document. Also, the translation data structure can be stored in the document itself, in metadata for the document, or elsewhere.

Figure 6:
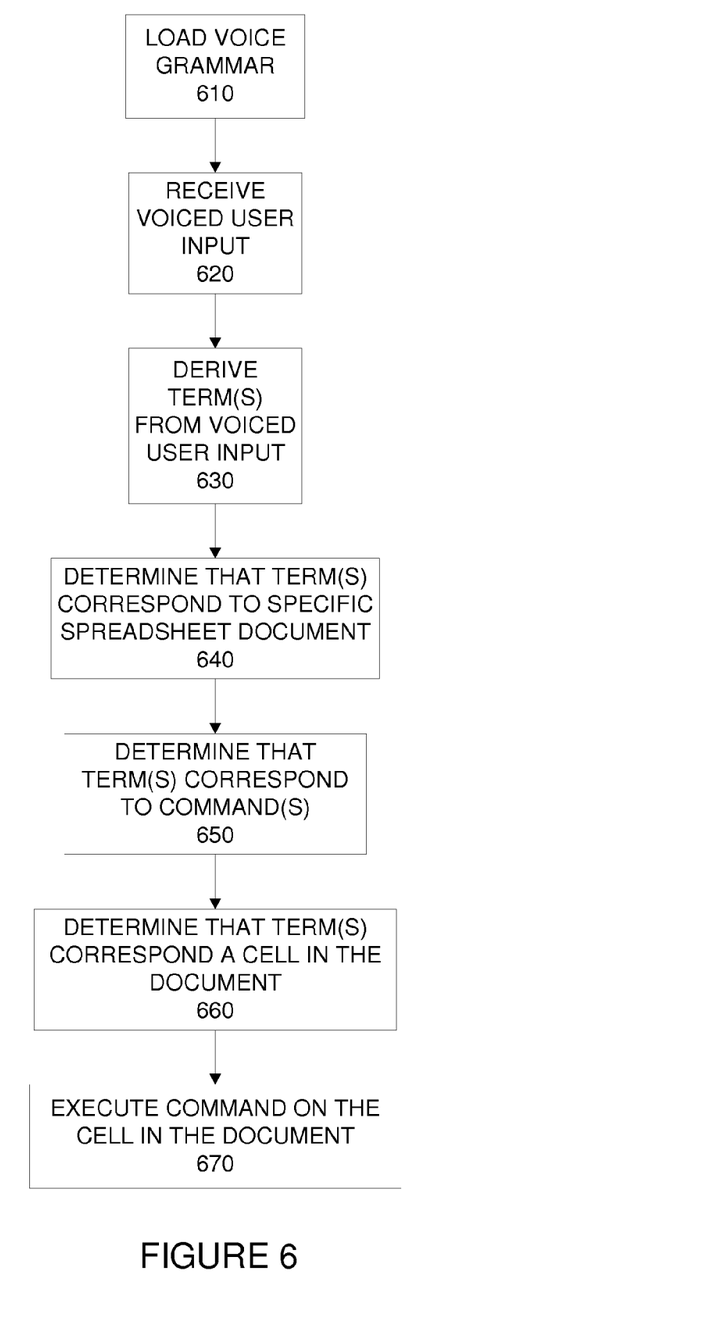
FIG. 6 is a flowchart of yet another technique for performing actions on digital document elements from natural language voice input.

Referring to FIG. 6, yet another technique for performing actions on digital document elements from natural language voice input will be discussed. The technique of FIG. 6 can include loading (610) a document-specific voice grammar into memory in a computer system. The computer system can correlate the voice grammar with a digital spreadsheet document in the computer system. For example, this correlation can be implemented by the computer system maintaining references to the voice grammar and to the digital document in the same section of a database, such as in the same row or same column in a database. Such a section of a database could also include references to one or more commands that are correlated to the voice grammar and the digital document, so that term(s) can be determined to correlate to the command(s) if the term(s) are determined to match the voice grammar. As another example, the voice grammar may be correlated with the digital document by being included in metadata for that digital document.

The technique of FIG. 6 can further include receiving (620) natural language voiced user input into the computer system via a natural language voice interaction computer component. The technique of FIG. 6 can further include deriving (630), via the natural language voice interaction computer component, a set of one or more terms from the voiced user input. Additionally, it can be determined (640) that the set of one or more terms corresponds to the digital spreadsheet document in the computer system. Also, the technique can include determining (650) that the set of one or more terms corresponds to at least one computer-executable command. This determination (650) can include determining that the set of one or more terms fits at least one of the grammatical form(s) defined by the grammar, as well as determining (660) that the set of one or more terms corresponds to a cell in the spreadsheet document. Additionally, the technique can include executing (670) the at least one command on the cell in the spreadsheet document. Executing (670) the at least one command can include taking one or more actions selected from a group consisting of entering in the cell a value derived from the set of one or more terms, reading from the cell a value requested by the set of one or more terms, and combinations thereof. For example, the one or more actions can include entering in the cell a value derived from the set of one or more terms. Also, the cell may be termed a first cell, and the one or more actions can further include reading a value from a second cell and audibly announcing the value in the second cell, with the value in the second cell being based at least in part on the value entered in the first cell. For example, the second cell can include a formula, and the formula can reference the first cell either directly or indirectly.

IV. Aspects of Certain Tools and Techniques

In one aspect, a computer-implemented method can include loading a document-specific natural language translation data structure into a computer memory in a computer system, the translation data structure being a computer-readable data structure that is identified in the computer system with a specific digital document in the computer system. The method can further include receiving natural language voiced user input into the computer system, and deriving, via the computer system, a set of one or more terms from the voiced user input. The method may also include determining, via the computer system, that the set of one or more terms corresponds to the specific digital document in the computer system, and the method may also include determining, via the computer system, that the set of one or more terms corresponds to at least one computer-executable command. The determination that the set of one or more terms corresponds to the at least one command can include analyzing the set of one or more terms using the document-specific natural language translation data structure. Additionally, the method can include determining, via the computer system, that the set of one or more terms corresponds to an element in the document, and executing the at least one command on the element in the document.

The method according to the preceding paragraph may include one or more of the following bulleted features:

The translation data structure can include a voice grammar, with the voice grammar being a template that defines one or more grammatical forms for voice-entered natural language terms, where determining that the set of one or more terms corresponds to the at least one command includes determining that the set of one or more terms fits at least one of the one or more grammatical forms defined by the grammar.

The method can include deriving a value from the set of one or more terms, where executing the at least one command on the element in the document includes entering the value into the element in the document. According to this feature, the method may further include playing an audible reading of a read-back value derived from the value entered into the element in the document. Also, according to this feature, the element in the document may be a first element, and the read-back value may be a value in a second element in the document, where the second element in the document is different from the first element in the document, and where playing the audible reading of the read-back value includes reading the read-back value from the second element in the document.

Executing the at least one command on the element in the document can include reading a value from the element in the document and returning the value, and the method can further include playing an audible reading of the value in response to receiving the natural language voiced user input into the computer system.

The method can further include receiving user input correlating the translation data structure with the digital document in the computer system, in response to which the computer system can correlate the translation data structure with the digital document.

The computer system can store a plurality of translation data structures, each identified with a different document of a plurality of documents stored in the computer system, where the translation data structure is a first translation data structure, where the document is a first document, where the natural language voiced user input is a first set of natural language voiced user input, the set of one or more terms is a first set of one or more terms, and the at least one command is a first command set including one or more commands. The method can further include the following: loading a second document-specific natural language translation data structure into the computer memory in a computer system, the second translation data structure being a computer-readable data structure that is identified in the computer system with a second specific digital document in the computer system; receiving a second set of natural language voiced user input into the computer system; deriving, via the computer system, a second set of one or more terms from the second set of voiced user input; determining, via the computer system, that the second set of one or more terms corresponds to the second specific digital document in the computer system; determining, via the computer system, that the second set of one or more terms corresponds to a second command set including at least one computer-executable command, the determination that the second set of one or more terms corresponds to the second command set including analyzing the second set of one or more terms using the second document-specific natural language translation data structure; determining, via the computer system, that the second set of one or more terms corresponds to an element in the second document; and executing the at least one command on the element in the second document.

The preceding bulleted features may be used with the basic method discussed in the paragraph preceding the bulleted features, and the bulleted features may also be used each other, in any combination of such features.

In another aspect, a computer system can include at least one processor and computer memory including instructions stored thereon that when executed by the at least one processor cause the at least one processor to perform acts. Those acts can include the following: receiving natural language voiced user input into the computer system; deriving a set of one or more terms from the voiced user input, the one or more terms specifying a value to be inserted; determining that the set of one or more terms corresponds to a digital document in the computer system; determining that the set of one or more terms corresponds to at least one computer-executable command, the determination that the set of one or more terms corresponds to the at least one command including analyzing the at least a portion of the set of one or more terms using a document-specific natural language translation data structure; determining that the set of one or more terms corresponds to an element in the document; and executing the at least one command on the element in the document, executing the at least one command including entering the value into the element.

In the method of the preceding paragraph, the document can be a document selected from a group consisting of a spreadsheet, a word processing document, a slide presentation document, and a Web page. Also, the document may be a spreadsheet, and the element in the document may be a cell in the spreadsheet. The translation data structure can be stored in metadata for the digital document, whether the document is a spreadsheet, a word processing document, a slide presentation document, a Web page, or some other type of digital document, and whether or not the element in the document is a cell in a spreadsheet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   loading a document-specific natural language translation data structure into a computer memory in a computer system, the translation data structure being a computer-readable data structure that is identified in the computer system with a specific digital document in the computer system;
   receiving natural language voiced user input into the computer system;
   deriving, via the computer system, a set of one or more terms from the voiced user input;
   determining, via the computer system, that the set of one or more terms corresponds to the specific digital document in the computer system;
   determining, via the computer system, that the set of one or more terms corresponds to at least one computer-executable command, the determination that the set of one or more terms corresponds to the at least one command comprising analyzing the set of one or more terms using the document-specific natural language translation data structure;

determining, via the computer system, that the set of one or more terms corresponds to a first element in the document; and executing the at least one command on the first element in the document in response to the receiving of the natural language voiced user input, with the executing of the at least one command comprising deriving a value from the set of one or more terms and entering the value into the first element in the document;

updating a second element in the document to produce a value in the second element, with the updating reflecting the entering of the value in the first element, and with the updating of the second element being performed in response to the receiving of the natural language voiced user input; and generating and instructing a computer component to audibly play a natural language statement of a read-back value derived from the value entered into the first element in the document in response to the receiving of the natural language voiced user input, with the read-back value being the value in the second element in the document that is different from the value entered into the first element in the document, with the second element in the document being different from the first element in the document.

2. The method of claim 1, wherein the translation data structure comprises a voice grammar, the voice grammar being a template that defines one or more grammatical forms for voice-entered natural language terms.

3. The method of claim 2, wherein determining that the set of one or more terms corresponds to the at least one command comprises determining that the set of one or more terms fits at least one of the one or more grammatical forms defined by the grammar.

4. The method of claim 1, wherein determining that the set of one or more terms corresponds to the first element in the document comprises identifying a location in the document.

5. The method of claim 1, wherein executing the at least one command on the first element in the document comprises reading a value from the first element in the document and returning the value.

6. The method of claim 5, wherein the method further comprises playing an audible reading of the value in the first element in response to receiving the natural language voiced user input into the computer system.

7. The method of claim 1, further comprising receiving user input correlating the translation data structure with the digital document in the computer system.

8. The method of claim 1, wherein the computer system stores a plurality of translation data structures, each identified with a different document of a plurality of documents stored in the computer system, wherein the translation data structure is a first translation data structure, wherein the document is a first document, wherein the natural language voiced user input is a first set of natural language voiced user input, wherein the set of one or more terms is a first set of one or more terms, wherein the at least one command is a first command set comprising one or more commands, and wherein the method further comprises:

loading a second document-specific natural language translation data structure into the computer memory in the computer system, the second translation data structure being a computer-readable data structure that is identified in the computer system with a second specific digital document in the computer system;

receiving a second set of natural language voiced user input into the computer system;

deriving, via the computer system, a second set of one or more terms from the second set of voiced user input;

determining, via the computer system, that the second set of one or more terms corresponds to the second specific digital document in the computer system;

determining, via the computer system, that the second set of one or more terms corresponds to a second command set comprising at least one computer-executable command, the determination that the second set of one or more terms corresponds to the second command set comprising analyzing the second set of one or more terms using the second document-specific natural language translation data structure;

determining, via the computer system, that the second set of one or more terms corresponds to an element in the second document; and executing the at least one command on the element in the second document.

9. The method of claim 1, wherein the method is performed at least in part by hardware logic.

10. The method of claim 1, wherein the read-back value is derived from the value entered into the first element using a formula that references the first element.

11. The method of claim 10, wherein the formula is a formula in the second element in the document.

12. A computer system comprising:

at least one computer processor; and computer memory comprising instructions stored thereon that when executed by at least one processor cause at least one processor to perform acts comprising:

receiving natural language voiced user input into the computer system;

deriving a set of one or more terms from the voiced user input, the one or more terms specifying a value to be inserted;

determining that the set of one or more terms corresponds to a digital document in the computer system;

determining that the set of one or more terms corresponds to at least one computer-executable command, the determination that the set of one or more terms corresponds to the at least one command comprising analyzing the at least a portion of the set of one or more terms using a document-specific natural language translation data structure;

determining that the set of one or more terms corresponds to a first element in the document;

executing the at least one command on the first element in the document, executing the at least one command comprising entering the value into the first element;

updating a second element in the document to produce a value in the second element, with the updating reflecting the entering of the value in the first element, and with the updating of the second element being performed in response to the receiving of the natural language voiced user input; and playing an audible reading of a read-back value derived from the value entered into the first element in the document in response to the receiving of the natural language voiced user input, with the read-back value being different from the value entered into the first element in the document, with the read-back value being a value in a second element in the document, and with the second element in the document being different from the first element in the document.

13. The computer system of claim 12, wherein the document is a document selected from a group consisting of a spreadsheet, a word processing document, a slide presentation document, and a Web page.

14. The computer system of claim 13, wherein the document is a spreadsheet and the element is a cell in the spreadsheet.

15. The computer system of claim 12, wherein the translation data structure is stored in metadata for the digital document.

16. The computer system of claim 12, wherein the natural language voiced user input expressly requests entry of the value that is entered in the first element, without expressly requesting the playing of the audible reading of the read-back value.

17. The computer system of claim 12, wherein the value in the read-back value is derived from the value entered into the first element using a formula that references the first element.

18. The computer system of claim 17, wherein the formula is a formula in the second element.

19. A computer system comprising:
at least one computer processor; and
computer memory comprising instructions stored thereon that when executed by at least one processor cause at least one processor to perform acts comprising:
loading a document-specific voice grammar into the memory in the computer system, the computer system correlating the voice grammar with a digital spreadsheet document in the computer system;
receiving natural language voiced user input into the computer system via a natural language voice interaction computer component;
deriving, via the natural language voice interaction computer component, a set of one or more terms from the voiced user input;
determining that the set of one or more terms corresponds to the digital spreadsheet document in the computer system;
determining that the set of one or more terms corresponds to at least one computer-executable command, the determination that the set of one or more terms corresponds to the at least one command comprising determining that the set of one or more terms fits at least one of one or more grammatical forms defined by the grammar;
determining that the set of one or more terms corresponds to a first cell in the spreadsheet document;
executing the at least one command on the first cell in the spreadsheet document in response to the receiving of the natural language voiced user input, executing the at least one command comprising entering in the first cell a value derived from the set of one or more terms;
reading a value that is in a second cell in the spreadsheet document, with the value in the second cell being derived from the value entered in the first cell, wherein the second cell includes a formula yielding the value in the second cell, and wherein the formula references the first cell; and
audibly announcing the value in the second cell in response to the receiving of the natural language voiced user input.

20. The computer system of claim 19, wherein acts include updating the second cell with the value in the second cell so that the value in the second cell reflects the entering of the value in the first cell, with the updating of the second cell being performed in response to the receiving of the natural language voiced user input.

* * * * *